United States Patent [19]

Miura et al.

[11] 4,397,914

[45] Aug. 9, 1983

[54] REINFORCING MATERIAL FOR A PANEL

[75] Inventors: Toshikatu Miura; Yukio Nagata; Yukio Okada, all of Tokyo, Japan

[73] Assignee: Nissan Motor Company, Limited, Yokohama, Japan

[21] Appl. No.: 356,454

[22] Filed: Mar. 9, 1982

[30] Foreign Application Priority Data

Mar. 16, 1981 [JP]   Japan .................................. 56-36566

[51] Int. Cl.³ .......................... B32B 5/20; B32B 3/10; B32B 3/08
[52] U.S. Cl. ..................................... 428/43; 296/187; 296/188; 428/136; 428/155; 428/158; 428/159; 428/174; 428/308.4; 428/319.3
[58] Field of Search .................... 428/43, 31, 158-160, 428/167, 308.4, 304.4, 319.3, 319.7, 155, 136, 174; 293/126, 128; 296/188, 189, 187; 156/79

[56] References Cited

U.S. PATENT DOCUMENTS 3,173,826  3/1965  Campbell et al. ..................... 156/79

FOREIGN PATENT DOCUMENTS 2061196  5/1981  United Kingdom .

Primary Examiner—Paul J. Thibodeau
Attorney, Agent, or Firm—Lane, Aitken & Kananen

[57] ABSTRACT

A material for reinforcing a panel includes a resin material and a expandable material. The expandable material is centered onto the resin material in such a manner that the edges of the resin material are exposed and can adhere to the panel. The expandable material includes an easy-bending portion in a position corresponding to a bent portion of the panel. The easy-bending portion is formed by a groove or by perforations in the expandable material.

4 Claims, 13 Drawing Figures

FIG.1(A) (PRIOR ART)
FIG.1(B) (PRIOR ART)
FIG.1(C) (PRIOR ART)
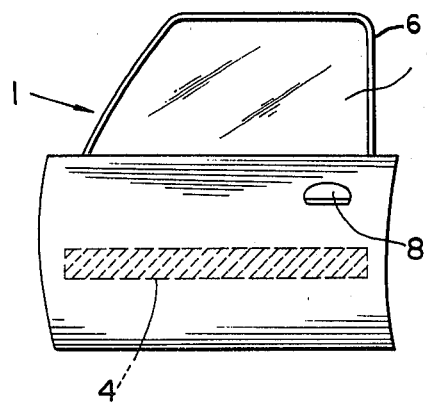
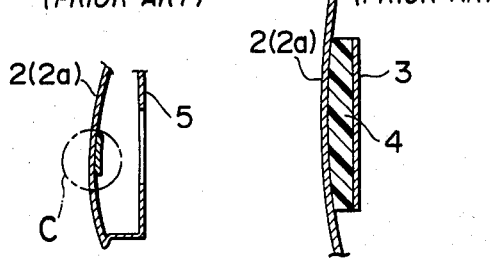
FIG.2(A) (PRIOR ART)
FIG.2(B) (PRIOR ART)
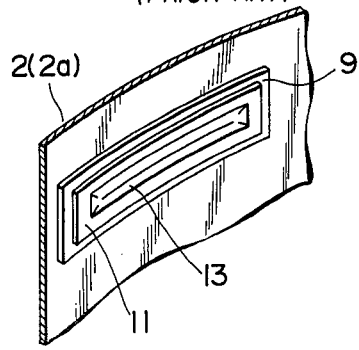
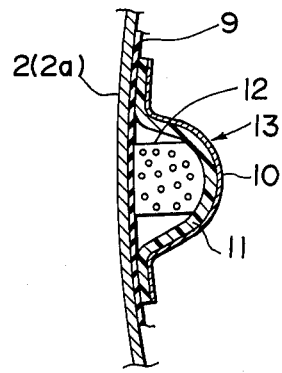
FIG.3
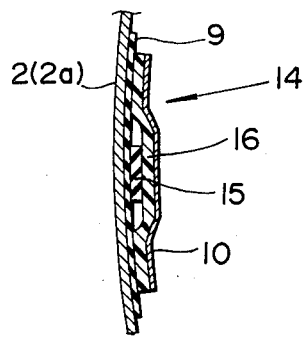

REINFORCING MATERIAL FOR A PANEL

BACKGROUND OF THE INVENTION

This invention relates to a material for reinforcing a panel such as an automobile door panel or roof panel.

A conventional reinforcing structure is shown in FIGS. 1(A), 1(B), and 1(C). A reinforcing member 4 is made of a thermosetting resin augmented with a reinforcing material composed of glass fibers or non-woven fabric. The reinforcing member 4 is affixed to the inner surface of a door outer panel 2 (metallic plate-like member 2a) of a door 1. Thereafter, the reinforcing member 4 is hardened by heating.

In FIG. 1, 5 is the door inner panel, 6 is the door window sash, 7 is the side window glass and 8 is the outside door handle.

In the case of such a reinforcing structure, a significant reinforcing effect cannot be obtained unless a large quantity of the resin material is used, which would increase the production cost and increase the weight. Also, it is difficult to conform the reinforcing member precisely to the shape of the panel to be reinforced, if the reinforcing member is molded and hardened in advance of its application to the plate-like member.

If a reinforcing structure is formed by bonding a reinforcing member consisting of unhardened resin to the panel and thermosetting the same, still the thick resin layer will not conform to areas of the panel with a small radius of curvature.

In either case, complete adhesion of the reinforcing member to the panel is difficult to achieve.

With these problems in mind, we previously proposed a panel for an automobile. As illustrated in FIGS. 2(A) and 2(B), a thermosetting resinous reinforcing member 11 is made of a tough epoxy resin, for example, augmented with a reinforcing material 10 such as glass fibers. The reinforcing member 11 is applied directly onto the inner surface 2a of a metallic panel 2 serving as a door outer panel, or on the coating film 9 plated onto said inner surface in advance for rust proofing.

A reinforcing rib 13 is integrally formed on the inner surface of the panel 2. The reinforcing rib 13 is composed of the thermosetting-resinous reinforcing member 11 and a foamable portion.

As shown in FIG. 3, a reinforcing material 14 is used to form the reinforcing rib 13. The reinforcing material is made by laminating an unhardened resin material 16 such as an unhardened epoxy resin over an expandable or foamable material 15 which has not yet expanded. Particularly the expandable material 15 is preferably a gas cell-forming material which will form a foam after heating, such as a strip of polyethylene foam or a foamable epoxy strip in the pre-foam state. By heating the expandable strip to expand the same, for example, during the coating-drying step at a later stage of automotive assembly, a bead-like portion 12 will be formed.

In order for the reinforcing rib 13 to have the desired height and strength, the expandable or foamable material 15 must expand in such a manner that the projection achieves a predetermined height. Generally, the thickness of the foamable material 15 should be reasonably large.

For this reason, even if the reinforcing material is formed in a sheet, the expandable material 15 will have some noticeable rigidity. The reinforcing material will not securely adhere to the panel 2 if the surface 2a of the panel 2 is irregular because the resin material will not conform completely to the complicated shape of the panel 2. Some portions of the resin material are apt not to adhere to the panel so that some small spaces will be present between the panel and the resin material. When the foamable material swells, such small spaces will increase in volume. As a result, the reinforcing effect will decrease.

OBJECT OF THE INVENTION

An object of this invention is to provide a material for reinforcing a panel which can securely adhere to the panel even if the surface of the panel is irregular.

BRIEF DESCRIPTION OF THE DRAWINGS

FIG. 1A is a front view of a prior art automobile door with a conventional reinforcing member;

FIG. 1B is a cross-sectional view of a portion of the automobile door shown in FIG. 1A;

FIG. 1C is a cross-sectional view of the encircled portion denoted by a reference letter C of the door and reinforcing member shown in FIG. 1B;

FIG. 2A is a perspective view of a portion of another prior art automobile door in which a conventional reinforcing member is used;

FIG. 2B is a cross-sectional view of the door and reinforcing member shown in FIG. 2A;

FIG. 3 is a cross-sectional view of a conventional reinforcing material before heating;

DESCRIPTION OF THE PREFERRED EMBODIMENT

Figure 4:
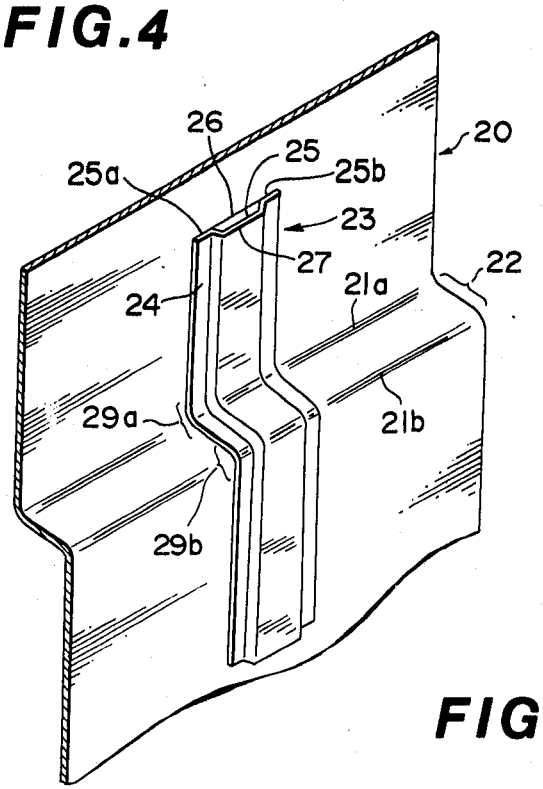
FIG. 4 is a perspective view of a first embodiment of this invention.
Figure 6:
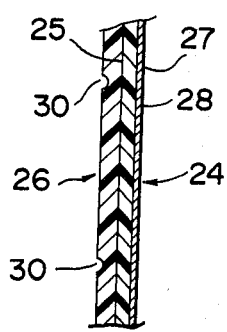
FIG. 6 is a cross-sectional view taken along the line VI—VI in FIG. 5.
Figure 5:
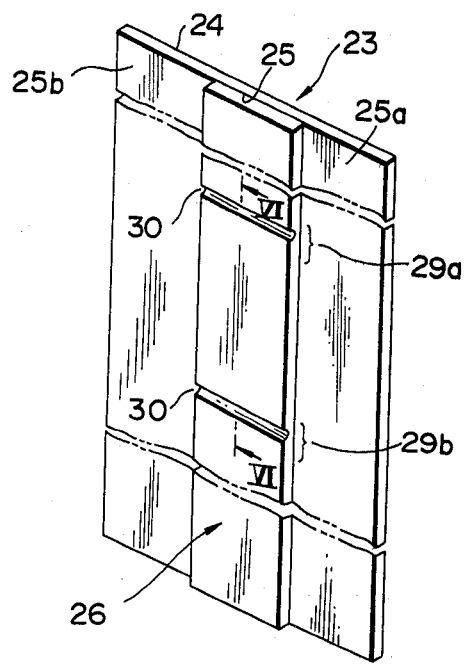
FIG. 5 is an enlarged perspective view of the reinforcing material of FIG. 4.

FIGS. 4 to 6 shows a first embodiment of this invention. A panel 20 such as an outer panel of an automobile door or roof has a surface 22 bent into a step shape with two transverse bent portions 21a, 21b. A reinforcing member 23 is affixed to the panel 20 perpendicular to the bent surface 22.

The reinforcing material 23 includes a sheet of unhardened resin material 24 and a strip of foamable material 26 which has not yet expanded. The edges 25 of the resin sheet extend beyond the periphery of the expandable material 26 to form adhesive surfaces 25a, 25b which can be bonded to the panel 20.

The resin material 24 is preferably a thermosetting resin which is flexible and adhesive at room temperature. Preferred examples of the resin material 24 are thermosetting epoxy resins such as Epikote #828, #1004 (products of Shell Chemical Co., a bisphenol A-type epoxy resin) mixed with Bailon #500 (product of Toyobo Co., Ltd., a thermosetting polyester resin), or said Epikote #828, #1004 (products of Shell Chemical Co., a bisphenol A type epoxy resin) mixed with Platamide H103P (product of Nihon Rilsan K.K., a copolymerized nylon resin) and a hardener such as docyandiamide. Also, the resin material 24 may be melamine-, phenol- or urea-type resins. In addition, it need not be limited to thermosetting resins but may be a resin which can be hardened at room temperature. If the resin material cannot adhere to the panel at room temperature, adhesive material can be additionally used on the edges 25 or the adhesive surfaces 25a, 25b.

Preferably, a secondary reinforcing member 28 is affixed to or embedded in the outer surface 27 of the resin material 24. The secondary reinforcing member 28 can be any material which can easily integrate with the resin material 24 to improve the strength of the resin material 24. Examples of the reinforcing member 28 are glass cloth such as WF 230-100N manufactured by Nitto Boseki Co. with the thickness of 0.22 mm, warp density of 19 threads/25 mm, and woof density of 18 threads/25 mm, glass fibers, carbon fibers, organic nonwoven cloth of polyester of polypropylene, kraft paper or the like.

The foamable material 26 is preferably a foam polyethylene sheet, foamable epoxy sheet or the like. Any foamable material can be used if it expands in volume to a predetermined degree prior to the thermosetting of the resin material 24, thereby stretching the central portion of the resin material 24 to form the reinforcing rib 13 on the panel 20. After thermosetting, the expandable material itself may be either tough or soft. Although it should preferably expand in response to heating, it can be designed to expand at room temperature under certain circumstances. For the best results, the foamable material should be an expandable epoxy resin such as said Epikote #1004 mixed with Hycar CTBN (product of B.F. Goodrich Chemical Co., a carboxyl group-containing nitrile rubber) and a dicyandiamide-type hardener and Vinyfor AK#2 (product of Eiwa Chemical Industry Co., Ltd., a foaming agent).

The expandable material 26 and the resin material are preferably formed into long strips.

The expandable material 26 which has not yet expanded is in advance formed with two grooves 30 at the positions corresponding to the bent portions 21a, 21b of the panel 20. As a result, two easy-bending portions 29a, 29b are formed in the expandable material 26 at the grooves 30 so that the expandable material 26 can be easily bent so as to conform to the shape of the panel 20.

The number of the grooves 30 in the expandable material 26 is optional. For instance, one groove may be formed. If a large number of grooves are formed at regular intervals, then a single standard strip of expandable material can be applied to panels of various shapes.

In any case, when the expandable material 26 is formed with a groove or grooves to create easy-bending portions, it can conform closely to the shape of the panel 20 even if the panel 20 is irregular.

If the panel 20 including the reinforcing material 23 is heat-treated, in a coating drying stage for a vehicle body, for example, the expandable material 26 and the resin material 24 will form the integral reinforcing rib 13 as they first expand and then set during heat-treating.

The grooves 30 can be formed in any shape. For instance, the groove 30 need not completely traverse the expandable material 26, but can be subdivided into separate short grooves (not shown). Also, the grooves can be formed in just the central portion of the expandable material 26. On the other hand, a pair of grooves can be formed at the edges of the expandable material 26.

Figure 7:
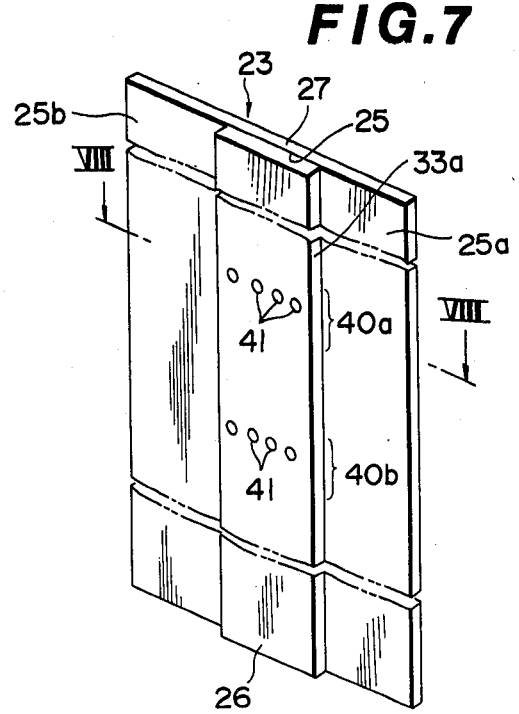
FIG. 7 is a perspective view of a second embodiment of this invention.
Figure 8:
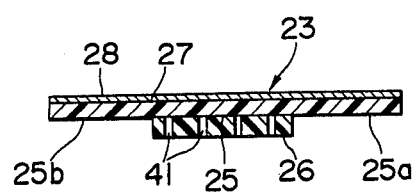
FIG. 8 is a cross-sectional view taken along the line VIII—VIII in FIG. 7.

FIGS. 7 and 8 show a second embodiment of this invention. The expandable material 20 which has not yet expanded uses perforations 41 to create easy-bending portions 40a, 40b.

Figure 9:
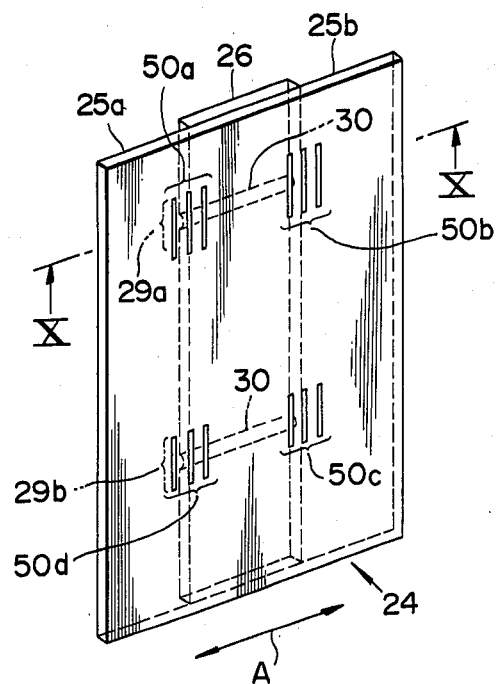
FIG. 9 is a perspective view of a third embodiment of this invention.
Figure 10:
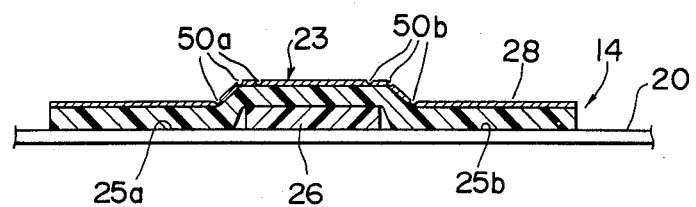
FIG. 10 is a cross-sectional view taken along the line X—X in FIG. 9 after the reinforcing material is affixed to a panel.

FIGS. 9 and 10 shows a third embodiment of this invention. In this embodiment, the expandable material 26 os formed with grooves 30 to create easy bending portions 29a, 29b therein as in the first embodiment. In addition, the reinforcing member 28 is formed with three slits or cut portions, designated by numerals 50a, 50b, 50c and 50d, near each end of the grooves 30 and perpendicular thereto. Thus, although the longitudinal rigidity of the reinforcing member 28 can be maintained, its transverse rigidity is decreased. In other words, the reinforcing member 28 can be easily bent to conform to the shape of the expandable material 26 as shown in FIG. 10 so that the surfaces 25a, 25b of the resin material can securely adhere to the panel 20.

As can be seen from the foregoing, according to this invention, an expandable material which has not yet expanded is centered on a strip of a hardenable resin material whereby the edges of the resin material extend beyond the expandable material to adhere to a panel, and the expandable material includes an easy-bending portion or portions created by forming one or more grooves or perforations in the expandable material. Therefore, even if the expandable material is thick enough to be reasonably rigid, it can still be easily bent so as to conform to the irregular shape of the panel to be reinforced. Thus, the expandable material can be applied to various shapes of panels. Since the resin material can easily and securely adhere to the panel, the reliability of production of a reinforcing rib formed by heat treatment of the expandable material and the resin material is increased.

What is claimed is:

1. In an automobile structure, a panel having a portion bent into a step shape, a reinforcing material fixed to the panel substantially perpendicular to the bent portion of the panel, the reinforcing material comprising:
   a resin material which was hardened by heating;
   a material which expanded irreversibly in response to heating;
   the expanded material being centered onto the resin material in such a manner that the edges of the resin material are exposed and can adhere to the panel;
   the expanded material including an easy-bending portion having plural perforations or a groove in a position corresponding to the bent portion of the panel.

2. The panel of claim 1, further including a film-like secondary reinforcing member affixed to the resin material.

3. The panel of claim 2, further comprising slits formed in the resin material near the ends of the perforations or the groove of the easy-bending portion of the expandable material and perpendicular thereto.

4. The panel of claim 1, wherein the panel is an outer panel of an automobile.

* * * * *